United States Patent
Chang et al.

(10) Patent No.: US 6,768,225 B2
(45) Date of Patent: Jul. 27, 2004

(54) MULTIPLE POWER SOURCES CONTROL SYSTEM

(75) Inventors: Herlin Chang, Shen Keng Shiang (TW); Min-Huang Huang, Taoyuan Hsien (TW)

(73) Assignee: DigiPower Manufacturing Inc., Taipei (TW)

( * ) Notice: Subject to any disclaimer, the term of this patent is extended or adjusted under 35 U.S.C. 154(b) by 170 days.

(21) Appl. No.: 09/941,604

(22) Filed: Aug. 30, 2001

(65) Prior Publication Data

US 2003/0042798 A1 Mar. 6, 2003

(51) Int. Cl.[7] .................................................. H02J 7/00

(52) U.S. Cl. .............................. 307/65; 307/18; 307/24; 307/29; 307/31; 307/80; 307/85

(58) Field of Search .............................. 307/18, 24, 29, 307/31, 65, 80, 85

(56) References Cited

U.S. PATENT DOCUMENTS

| | | | | |
|---|---|---|---|---|
| 4,961,059 A | * | 10/1990 | Anderson | 333/19 |
| 5,185,536 A | * | 2/1993 | Johnson, Jr. et al. | 307/66 |
| 5,798,578 A | * | 8/1998 | Thereze | 307/18 |
| 6,188,592 B1 | * | 2/2001 | Farrington et al. | 363/98 |
| 6,212,079 B1 | * | 4/2001 | Balakrishnan et al. | 363/21 |
| 6,218,810 B1 | * | 4/2001 | Matsumoto | 320/134 |
| 6,324,077 B1 | * | 11/2001 | Lopresti et al. | 363/16 |
| 6,381,155 B1 | * | 4/2002 | Kadatsky et al. | 363/65 |

* cited by examiner

*Primary Examiner*—Robert DeBeradinis
(74) *Attorney, Agent, or Firm*—Alan D. Kamrath; Nikolai & Mersereau, P.A.

(57) ABSTRACT

A multiple power sources control system has several power input sides can switch a power source to other power sources of power input sides as original power source of one of power input sides has an abnormal phenomenon (such as no power supply, too low or high voltage and abnormal frequency, etc.) such that loads can keep obtaining supplied power. In addition, power of loads has better protection because of multiple input power supply.

18 Claims, 5 Drawing Sheets

MULTIPLE POWER SOURCES CONTROL SYSTEM

BACKGROUND OF THE INVENTION

1. Field of the Invention

The present invention relates to a multiple power sources control system, especially for a new one which can make loads of load side keep obtaining power supply due to that an inside control module switches the original used power source to another power source.

2. Description of the Prior Art

Commonly used power supply systems mostly have a single power source to input required power to supply all loads. When the power source is abnormal, (such as that power is not supplied, voltage is too low or too high and the frequency is abnormal, etc.), loads may not work or objects of loads are damaged.

Therefore, someone invented an uninterruptible power supply (UPS). The theory of UPS is that UPS is under charging state as common power source input power to loads normally, and the charging state of UPS is transferred to discharging state as common power source can't input to loads. However, amount of power supplied from UPS is limited, and thus power which loads require can't be satisfied if amount of power is used up.

Thus it can be seen that the common seen object described above has many disadvantages and is really not a perfect design needing improving.

The inventor of the invention ruminated over the disadvantages resulted from the commonly seen power control system described above. After studying hard for a long period, the inventor finally succeeded in inventing the present invention, a multiple power sources control system.

SUMMARY OF THE INVENTION

The first purpose of the present invention is to provide a multiple power sources control system, which uses inside detecting module and control module in coordinating with power source switches to make loads keep working and avoid damage under abnormal power.

The second purpose of the present invention is to provide a multiple power sources control system, which can switch power source for supplying loads immediately with no lagging phenomenon to make loads keep obtaining power. Besides, loads have multiple protections because of multiple power sources for inputing.

The third purpose of the present invention is to provide a multiple power control system, which can proceed power calculation and loads management via a control module, and make two or more than two independent power sources in parallel connection to get larger output power via a harmonic signal.

The multiple power sources control system which can achieve the purposes described above comprises: power input sides, voltage and current detecting modules, a control module, power source switching module, and power output sides; the power input sides can receive at least two independent input power sources (such as a common power source, an UPS, and a generator, etc.). When one of independent input power source is in an abnormal state, the voltage and current detecting module will inform the control module of the state, and then the control module controls the power source switching module immediately to switch power source supplying to power output sides to other normal independent power sources of the power input sides such that loads can keep on obtaining required power.

BRIEF DESCRIPTION OF THE DRAWINGS

The drawings disclose an illustrative embodiment of the present invention which serves to exemplify the various advantages and objects hereof, and are as follows.

Diagram Remarks

Figure 1:
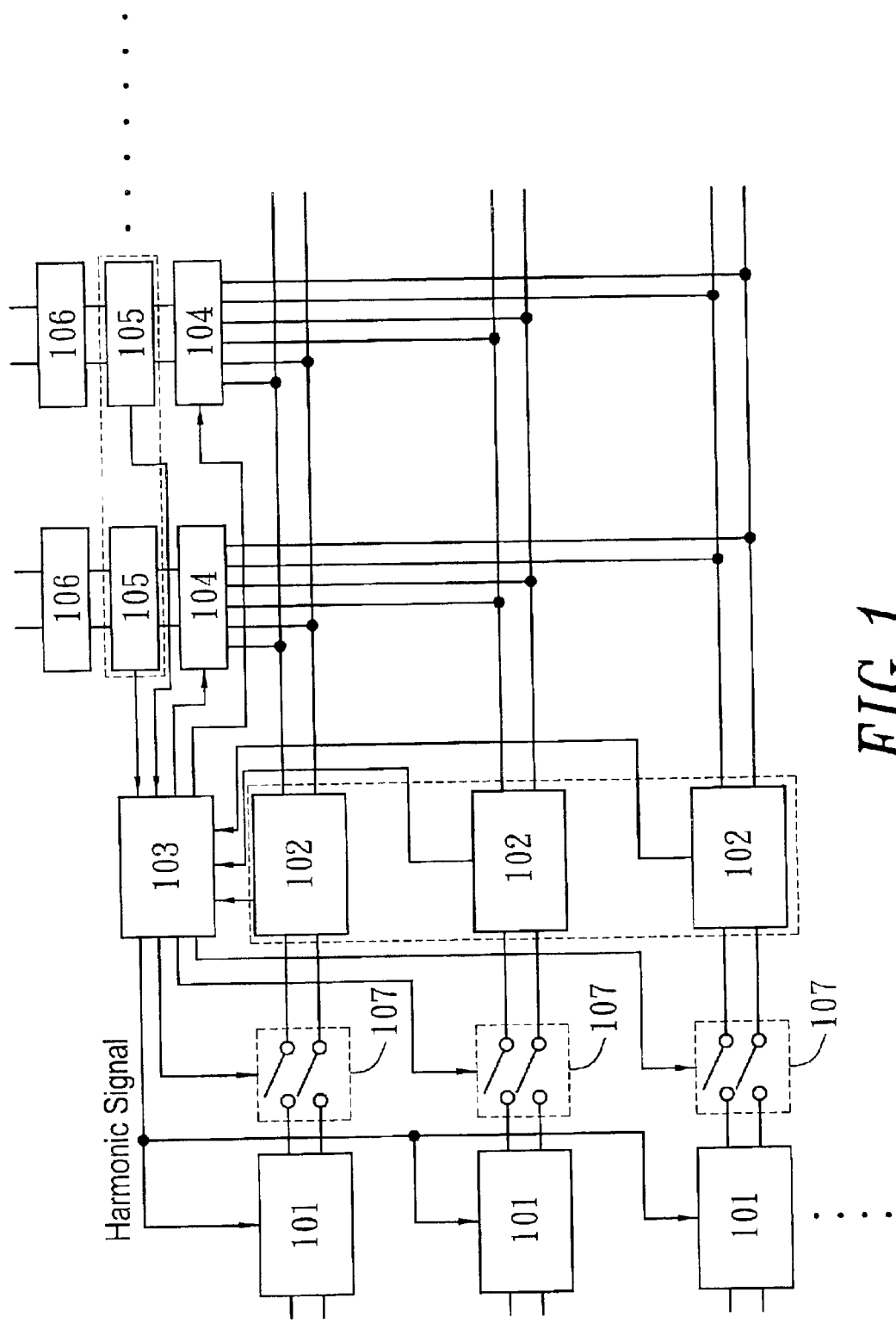
FIG. 1 is the block diagram of system construction of the present invention, a multiple power sources control system.

101 Power input side
102 First voltage and current detecting module
103 Control module
104 Power source switching module
105 Second voltage and current detecting module
106 Power output side
107 Control switch
21 Power source transfer switch
22 Load
31 Bridge rectifier
32 MOSFET transistor
33 Bias circuit
34 Coupler
35 Control signal
36 Load
41 First MOSFET transistor
42 Second MOSFET transistor
43 First diode
44 Second diode
45 Control signal
46 Load
47 Coupler

DETAILED DESCRIPTION OF THE PREFERRED EMBODIMENT

Referring to FIG. 1, a multiple power sources control system mainly comprises: power input sides 101, first voltage and current detecting modules 102, control switches 107, second voltage and current detecting modules 105, a control module 103, power source switching modules 104, and power output sides 106; there are at least two power input sides 101, which can receive two or more than two independent power source; the control switches 107 are in ON or OFF state controlled by the signal of the control module 103.

The first voltage and current detecting module 102 is to detect if the power of the power input sides 101 are abnormal, and inform the control module 103 of detected state; the second voltage and current detecting module 105 is to detect if the power of the power output sides 106 is abnormal and then inform the control module 103 of detected state.

The power source switching module 104 is used to switch the power sources of power output sides 106 by the signal of the control module 103.

The control module 103 is used to control the control switches 107 and power the source switching modules 104 due to the state infirmed from the first voltage and current detecting modules 102 and the second voltage and current detecting modules 105, and to output a harmonic signal to the power input sides 101 to make input power sources in harmony.

The number of the power output sides 106 can be one or more than one due to requirements, and the function of the power output sides 106 is to supply loads with required power.

According to combination of above-described components, when one of the independent power source is abnormal, the voltage and current detecting module can inform the control module 103 of the state to make the control module 103 immediately control the power source switching module 104 to switch the power source supplying power output sides 106 to other normal independent power sources of the power input sides 101 such that the loads can keep obtaining required power. In the other band, the multiple power sources control system of the present invention can proceed power calculation and load management (harmonizing frequencies of every power input sides 101 to be in synchronous state), which can make two or more than two independent power sources in parallel connection to get larger power output.

Figure 2:
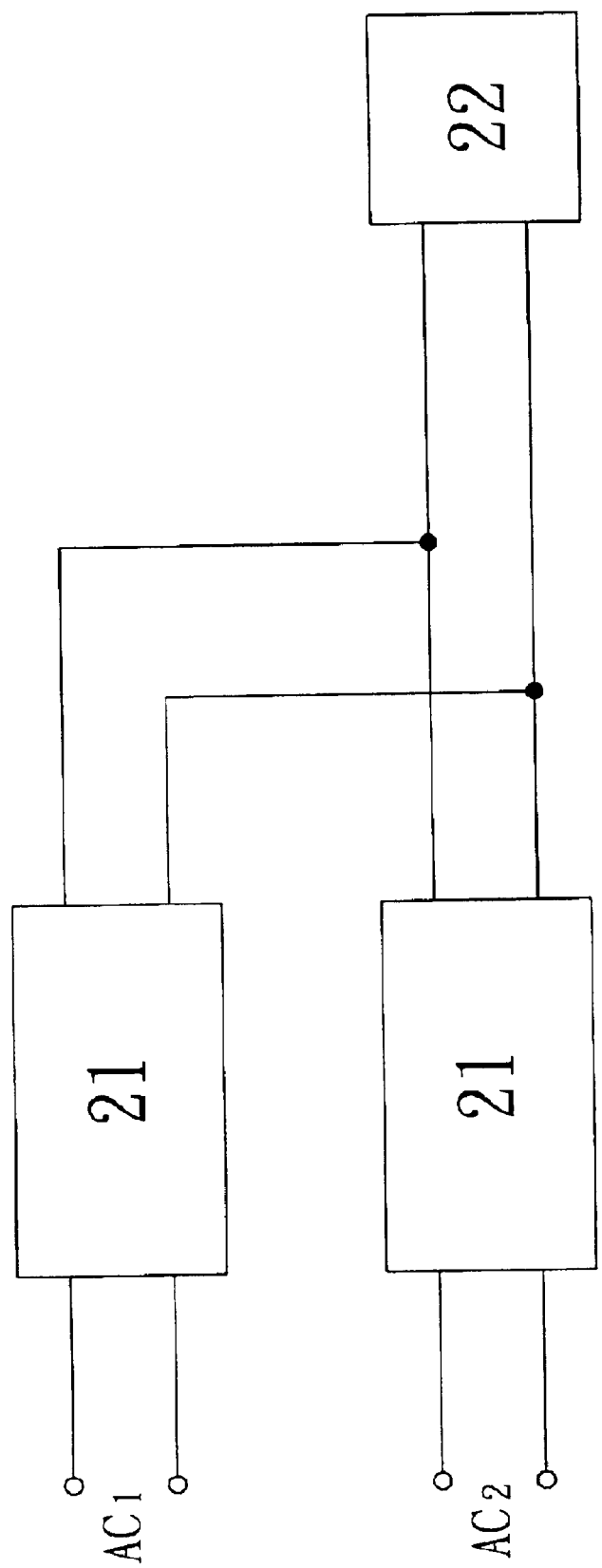
FIG. 2 is the schematic diagram of the control circuit of the commonly used switch.

Referring to FIG. 2, which is the schematic diagram of the control circuit of the commonly used switch, the circuit of commonly used power source transfer switches 21 is to use SCR or silicon controlled rectifier. When the power of AC1 is abnormal, the power source transfer switch 21 switches the power source for loads 22 to AC2 to make loads 22 keep obtaining power. When the phase angle of AC1 is not 0 or 180 degrees, or there is an electroweak effect, if the power source transfer switch 21 witches power source to AC2, the voltage of AC2 may feedback to AC1 because SCR or silicon controlled rectifier can't turn off AC1, and therefore, danger may be produced.

Figure 3:
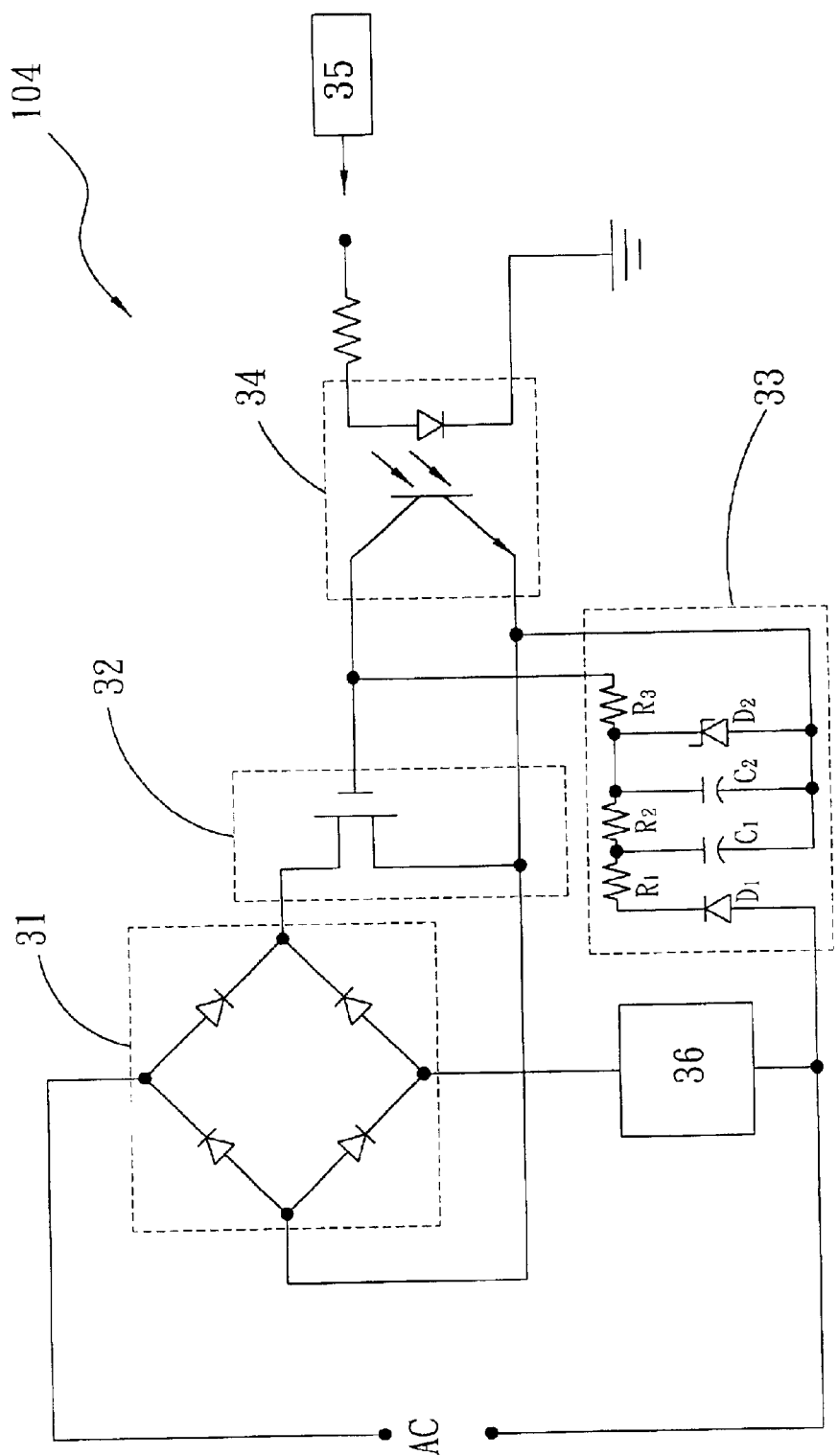
FIG. 3A is the schematic diagram of the control circuit and the inside bias of the power source switching module of the multiple power sources control system.
FIG. 3B is another schematic diagram of the circuit of the inside bias of the power source switching module of the multiple power sources control system.
Figure 3:
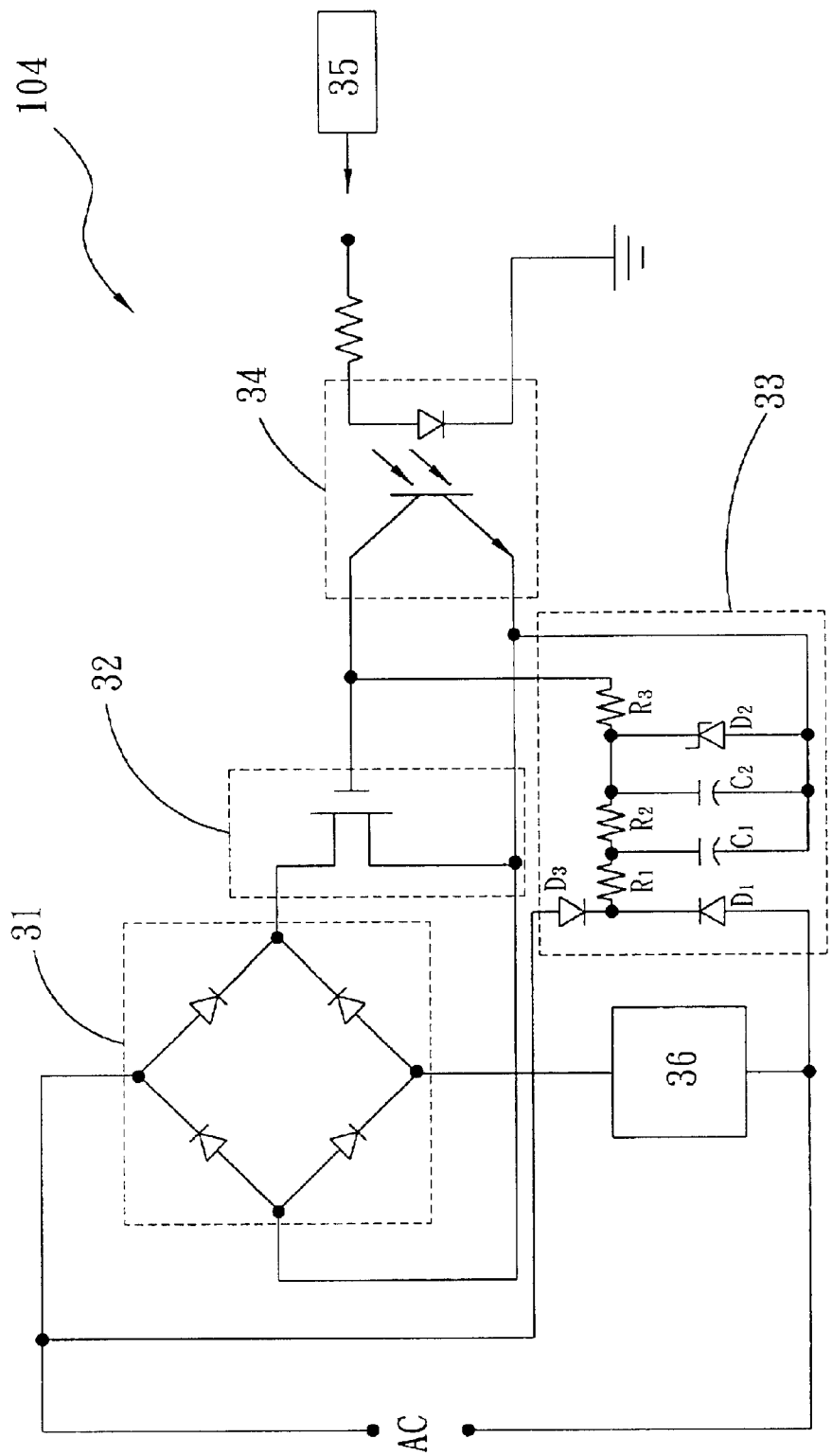

Referring to FIG. 3A, the power source switching module 104 is composed of a bridge rectifier 31, MOSFET transistor 32 (IGBT or other power components which can be turned on or turned off immediately also cube used), a bias circuit 33 and a coupler 34. An external control signal 35 can make the coupler 34 in the ON or OFF state to control whether the MOSFET transistor 32 output the power passing through the bridge rectifier 31. The power source switching module 104 can control whether power is output by control signal 35 such that there is no danger commonly power source switches may have. In the other hand, D1 of the bias voltage circuit 33 is used to process half-wave rectification, R1 and C1 are used to process first stage voltage decay and filtering wave, R2 and C2 are used to process second-stage voltage decay and filtering wave, and then D2 and R3 are used to determine the magnitude of voltage of bias of the MOSFET transistor 32. Besides, D3 can be added into the bias circuit 33 to proceed the task of full-wave rectification of power (shown in FIG. 3B).

Figure 4:
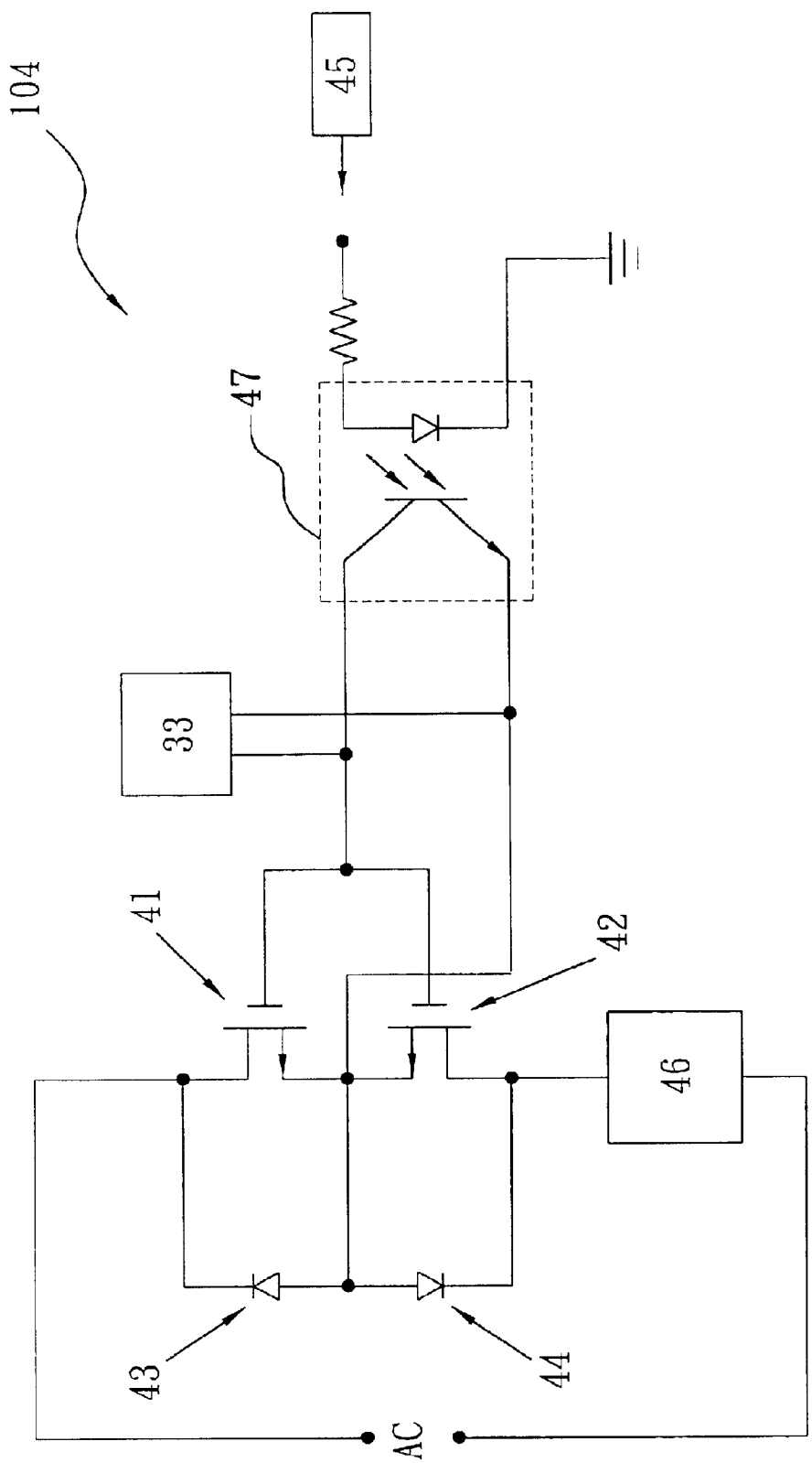
FIG. 4 is the schematic diagram of the control circuit of another power source switching module of the multiple power sources control system.

Referring to FIG. 4, the power source switching module 104 can also be composed of a first MOSFET transistor 41, a second MOSFET transistor 42 (the first MOSFET transistor 41, the second MOSFET transistor 42 can be replaced with IGBT or other power components which can be switched immediately), a first diode 43, a second diode 44, a bias circuit 33 and a coupler 47. An external control signal 45 can make the coupler 47 in ON or OFF state to control action of first MOSFET transistor 41, second MOSFET transistor 42, first diode 43 and second diode 44 to further control the power transmitted to loads 46. In addition, the coupler has the function of separating high-voltage power.

Comparing with other commonly used technologies, the multiple power sources control system provided from the present invention has following advantages:

1. The multiple power sources control system provided from the present invention has several power input sides, and uses inside detecting module and control modules in coordinating with power source transfer switches to make loads keep working and avoid damage under an abnormal power source.
2. The multiple power sources control system provided from the present invention has a power source transfer switch which can switch power source used to supply loads immediately without lagging phenomenon to make loads keep obtaining power. Besides, loads have multiple protection because of multiple input power sources.
3. The multiple power sources control system provided from the present invention can proceed power calculation and loads management via a control module, and make two or more than two independent power sources form as a parallel connection to get larger output power.

Many changes and modifications in the above described embodiment of the invention can, of course, be carried out without departing from the scope thereof. Accordingly, to promote the progress in science and the useful arts, the invention is disclosed and is intended to be limited only by the scope of the apprised claims.

What is claimed is:

1. A first multiple power sources control system, switching an originally used power source having an abnormal phenomenon to normal power sources to make loads keep obtaining supplied power and providing power calculation and load management to make a plurality of power sources in parallel connection to get larger power output, comprising:

a plurality of power input sides used to receive a plurality of external independent power sources;

a plurality of first voltage and current detecting modules used to detect whether said power sources of said power input sides is abnormal;

a plurality of power output sides used to supply a plurality of loads with required power;

a plurality of second voltage and current detecting modules used to detect whether power of said power output sides is abnormal;

a plurality of power source switching modules used to switch a power source supplying said power output sides with power due to a signal of a control module; and said control module controlling a plurality of control switches to be in an ON or OFF state and controlling said power source switching modules according to a state informed from said first voltage and current detecting modules and said second voltage and current detecting module and can output a harmonic signal to said power input sides.

2. The multiple power sources control system as recited in claim 1, wherein at least two said power input sides receive the plurality of said external independent power sources.

3. The multiple power sources control system as recited in claim 1, wherein at least one said power output side supplies at least one of said loads with power.

4. The multiple power sources control system as recited in claim 1, wherein at least one first voltage and current detecting module detects at least two of said power input sides.

5. The multiple power sources control system as recited in claim 1, wherein at least one second voltage and current system detects at least one of said power output sides.

6. The multiple power sources control system as recited in claim 1, wherein said power source switching modules switches at least two of said plurality of independent power sources.

7. The multiple power sources control system as recited in claim 1, wherein at least one of said power source switching modules are provided.

8. The multiple power sources control system as recited in claim 1 further comprising:
   a MOSFET transistor to control whether power is transmitted to at least one of the plurality of loads;
   a bridge rectifier to rectify power to provide said MOSFET transistor with an electric current;
   a bias circuit to provide said MOSFET transistor a fixed bias; and
   a coupler to control a state of said MOSFET transistor by an external control signal passing through said coupler.

9. The multiple power sources control system as recited in claim 8, wherein said MOSFET transistor is replaced by other transistor components.

10. The multiple power sources control module system as recited in claim 8, wherein said coupler is replaced by other transistor components.

11. The multiple power sources control system as recited in claim 8, wherein said bias circuit comprises:
    a first transistor D1 used to rectify power;
    a first resistance R1;
    a first capacitance C1 proceeding first-stage voltage decay and filtering wave of power rectified by said first transistor D1 in coordination with said first resistance R1;
    a second resistance R2;
    a second capacitance C2 proceeding second-stage voltage decay and filtering wave of power processed by said first resistance R1 and said first capacitance C1 in coordination of said second resistance R2;
    a third resistance R3; and
    a Zener transistor D2 processing power processed by said second resistance R2 and said second capacitance C2 in coordination with said third resistance R3.

12. The multiple power sources control system as recited in claim 11, wherein a third transistor D3 is added into said bias circuit to work in coordination with said first transistor D1.

13. A second power source control module, comprising:
    a first MOSFET transistor;
    a second MOSFET transistor;
    a first diode;
    a second diode;
    a bias circuit providing said first MOSFET transistor and said second MOSFET transistor with a fixed bias; and
    a coupler controlling states of said first MOSFET transistor, said second MOSFET transistor, said first diode, and said second diode by an external control signal passing through said coupler.

14. The second power source control module as recited in claim 13, wherein said MOSFET transistor is replaced with IGBT or other power components which can be turned on or off immediately.

15. The second power source control module as recited in claim 13, wherein said coupler is replaced with other transistor components.

16. The second power source control module as recited in claim 13, wherein said bias circuit is replaced with other transistor components.

17. The second power source control module as recited in claim 13, wherein said bias circuit comprises:
    a first transistor D1 used to rectify power;
    a first resistance R1;
    a first capacitance C1 used to proceed first-stage voltage decay and filtering wave of power rectified by and said first transistor D1 in coordination with said first resistance R1;
    a second resistance R2;
    a second capacitance C2 used to proceed second-stage voltage decay and filtering wave of power processed by said first resistance R1 and said first capacitance C1 in coordination with said second resistance R2;
    a third resistance R3; and
    a Zener diode D2 used to process power processed by said second resistance R2 and said second capacitance C2 in coordination with said third resistance R3.

18. The second power source control module as recited in claim 17, wherein a second diode D2 is added into said bias circuit to work in coordination with said Zener diode D1 to rectify.

* * * * *